United States Patent [19]

Atwater et al.

[11] Patent Number: 5,155,149

[45] Date of Patent: Oct. 13, 1992

[54] SILICONE POLYURETHANE COPOLYMERS CONTAINING OXYGEN SENSITIVE PHOSPHORESCENT DYE COMPOUNDS

[75] Inventors: Beauford W. Atwater, Edison; Suzanne Klima, Oradell, both of N.J.

[73] Assignee: BOC Health Care, Inc., Murray Hill, N.J.

[21] Appl. No.: 774,769

[22] Filed: Oct. 10, 1991

[51] Int. Cl.$^5$ ................................. C08K 5/34
[52] U.S. Cl. ..................... 524/88; 524/588; 524/589; 528/28; 528/38
[58] Field of Search .............. 524/588, 589, 88; 528/28, 38

[56] References Cited

U.S. PATENT DOCUMENTS

| | | | |
|---|---|---|---|
| 3,888,891 | 6/1975 | Smith et al. | 528/38 |
| 4,313,858 | 2/1982 | Earing et al. | 524/590 |
| 4,330,637 | 5/1982 | Wong | 524/720 |
| 4,361,691 | 11/1982 | Yajima et al. | 528/28 |
| 4,552,818 | 11/1985 | Wong | 524/89 |
| 4,714,770 | 12/1987 | Hsu et al. | 556/419 |
| 4,719,281 | 1/1988 | Choe | 528/310 |
| 4,866,152 | 9/1989 | Lo | 528/25 |
| 4,868,251 | 9/1989 | Reich et al. | 525/479 |
| 4,962,177 | 10/1990 | Lo | 528/38 |

Primary Examiner—John C. Bleutge
Assistant Examiner—Karen A. Hellender
Attorney, Agent, or Firm—R. Hain Swope; Larry R. Cassett

[57] ABSTRACT

The present invention is directed to silicone polyurethane copolymers containing phosphorescent dye compounds wherein the copolymers are represented by the formula:

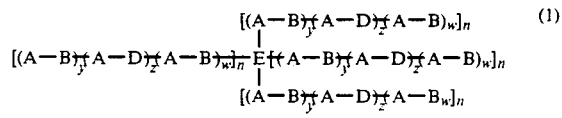

wherein n is an integer ranging from 1 to about 30, and y, z, and w are integers ranging from 0 to about 40, wherein one of y, z, and w is at least one; and A is a diamide, B is a silicone block copolymer, D is a chain extender, and E is a phosphorescent porphyrin-type compound.

12 Claims, No Drawings

SILICONE POLYURETHANE COPOLYMERS CONTAINING OXYGEN SENSITIVE PHOSPHORESCENT DYE COMPOUNDS

BACKGROUND OF THE INVENTION

1. Field of the Invention

The present invention is directed to silicone copolymers containing oxygen sensitive compounds. More particularly, this invention is directed to silicone polyurethane copolymers covalently bonded to phosphorescent dye compounds which are useful in fiber optic probes for the in vivo measurement of physiological gases.

2. Description of the Prior Art

The measurement of the partial pressure of oxygen in blood and tissue is important for the diagnosis of disease and the monitoring of patients during surgical and intensive care procedures. The use of fiber optic probes employing luminescence quenching for such biomedical measurements has become very popular because these probes are easy to insert, involve no electrical hazards, and are economical to produce.

In a fiber optic probe employing luminescence quenching, light from a suitable source is transmitted through long, thin, optically conducting flexible fibers of glass, plastic, or other transparent material to a receptor terminal containing a luminescent dye on an oxygen permeable support medium. The light causes the dye to luminesce and oxygen present in the blood or tissue quenches the luminescence. The light is then returned along the optical fiber to a light measuring instrument containing photomultiplier or photodiode tubes and an electronic computing circuit for processing. A number of types of fiber optic probes employing luminescence quenching are known.

U.S. Pat. No. 4,714,770, issued to Huse et. al., discloses a dye-containing silane composition wherein a fluorescent polynuclear aromatic dye and a silane derivative are bonded through a urethane linkage. The dye-containing silane composition may then be linked to a polysiloxane, through a silicon polymer reactive substituent on the silane derivative, to form a dye-containing polysiloxane.

U.S. Pat. No. 4,868,251, issued to Reich et. al., discloses an ultraviolet light absorbing silicon composition prepared by covalently bonding, by platinum catalysis, a hydride functional silicone base polymer with an ultraviolet light absorbing compound containing a terminal double bond.

U.S. Pat. No. 4,866,152, issued to Lo, discloses fluorescent organosilicon compounds prepared by covalently bonding an aminoalkylfunctional organosilicon compound with a fluorescent organoaldehyde or a fluorescent organosulfonic acid by condensation.

U.S. Pat. No. 4,719,281, issued to Choe, discloses polymers consisting of enediamine-quinoid derivatives bonded to polyurethane groups or organosiloxyl groups.

U.S. Pat. No. 4,361,691, issued to Yajima et. al., discloses a method for preparing a heat resistant polymer which comprises reacting a diamine with a metallosiloxane compound containing siloxane bonds and metalloxane bonds. The metal may be titanium, zirconium, vanadium, phosphorous, aluminum, iron, chromium, cobalt, nickel, germanium, tin, arsenic, magnesium, lead, or antimony.

While a number of fiber-optic probe devices have been reported, none of these devices are entirely satisfactory. Many luminescent dyes are fluorescent dyes which require expensive instrumentation to employ because such dyes have short emission lifetimes and are not highly sensitive to quenching. Most fluorescent dyes are also sensitive to several anesthetic gases, often present in patients requiring tissue oxygenation monitoring. Furthermore, the permeability and solubility of the physiological gas in the support medium for the dye is not always optimal for the particular instrumentation employed. Accordingly, fiber optic probes containing dyes which are inexpensive to use and support media which can be altered to vary gas permeability and solubility would be highly desirable. The present invention provides such improved polymeric support media containing dyes for use in fiber optic probes employing luminescence quenching and methods by which such fiber optic probe materials can be made.

SUMMARY OF THE INVENTION

The present invention is directed to silicone polyurethane copolymers containing phosphorescent dye compounds wherein the copolymers are represented by the formula:

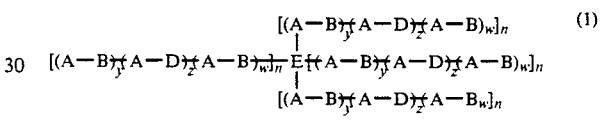
(1)

wherein n is an integer ranging from 1 to about 30, and y, z, and w are integers ranging from 0 to about 40, wherein one of y, z, and w is at least one; and (a) A is a diamide group having the formula:

—CONH—$R_1$—NHCO— wherein $R_1$ is selected from the group consisting of substituted and unsubstituted alkyl groups, cycloalkyl groups, and aryl groups, each $R_1$ group containing from 1 to about 30 carbon atoms;

(b) B is a silicone block copolymer having the formula:

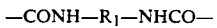

wherein $R_2$ is selected from the group consisting of substituted and unsubstituted alkyl groups, cycloalkyl groups, and aryl groups, each $R_2$ group being the same or different and having from 1 to about 18 carbon atoms; $R_3$ is selected from the group consisting of substituted and unsubstituted alkyl groups, cycloalkyl groups, and aryl groups, each $R_3$ group having from 1 to about 18 carbon atoms; X is selected from the group consisting of oxygen and nitrogen; u is an integer ranging from about 5 to about 15; and v is an integer ranging from about 5 to about 50;

(c) D is a chain extender having the formula:

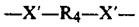

wherein $R_4$ is selected from the group consisting of substituted and unsubstituted alkyl groups, cycloalkyl groups, and aryl groups, each $R_4$ group having from 1 to about 12 carbon atoms; and X' is selected from the group consisting of oxygen and nitrogen; and (d) E is a phosphorescent dye compound having the formula:

wherein $R_5$ is a porphyrin-type compound chelated with a metal ion selected from the group consisting of platinum, palladium, rhodium, and gadolinium, and $X''$ is selected from the group consisting of oxygen and nitrogen.

DETAILED DESCRIPTION OF THE INVENTION

The present invention is directed to silicone polyurethane copolymers covalently bonded to oxygen sensitive phosphorescent dye compounds which are useful in fiber optic probes for the in vivo measurement of physiological gases. The phosphorescent dye compounds are sensitive to luminescence quenching and require relatively simple instrumentation to employ because such compounds need only visible light for excitation and have long emission lifetimes. In contrast to fluorescent compounds, phosphorescent dye compounds are essentially insensitive to inhalation anesthetics. By covalently bonding the dye compounds to a support medium constructed of silicone block copolymers and chain extenders coupled by polyurethane bonds, the permeability and solubility of oxygen in the support medium can be optimized. The resulting dye-containing silicone polyurethane copolymers are sensitive to oxygen quenching, essentially insensitive to inhalation anesthetics, resistant to photobleaching, and have fast response times.

In accord with the present invention, the silicone polyurethane copolymers containing phosphorescent dye compounds are represented by Formula (1) set out below:

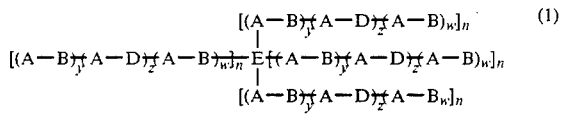

wherein A is an organic diamide group, B is a silicone block copolymer, D is a chain extender, and E is a phosphorescent porphyrin-type compound. Diamide group A (—COHN—$R_1$—NHCO—) is derived from the corresponding diisocyanate precursor (CON—$R_1$—NCO). Condensation of the diisocyanate precursor with the active hydrogen containing components of the polymer, e.g., the silicone block copolymer, the chain extender, and the phosphorescent porphyrin-type compound, forms polyurethane bonds (—O—CO—N=) or polyurea bonds (=N—CO—N=), or both. For convenience, the silicone copolymers of the present invention will be referred to as silicone polyurethane copolymers.

In Formula (1), n is an integer ranging from 1 to about 30, preferably from 1 to about 15, and more preferably about 8. Y and w are integers ranging independently from 0 to about 40, preferably from 0 to about 10, and more preferably from 1 to about 3. Z is an integer ranging from 0 to about 40, preferably from 0 to about 15, and more preferably from about 3 to about 5. In Formula (1), one of y, z, and w is at least one.

Group A in Formula (1) is a diamide group having the formula:

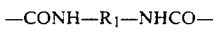

Diamide groups are organic compounds having two amide functional groups (—NHCO—) attached to a divalent organic radical (—$R_1$—). As set out above, the diamide groups are derived from the corresponding diisocyanates by condensation of the diisocyanates with the active hydrogen containing silicone block copolymer, the chain extender, and the phosphorescent porphyrin-type compound.

In group A, $R_1$ is selected from the group consisting of substituted and unsubstituted alkyl groups, cycloalkyl groups, and aryl groups, each $R_1$ group containing from 1 to about 30 carbon atoms. In a preferred embodiment, $R_1$ is an alkyl or aryl group containing from 1 to about 20 carbon atoms. In a more preferred embodiment, $R_1$ is an alkyl or aryl group containing from 1 to about 15 carbon atoms.

Nonlimiting examples of diisocyanate compounds from which diamide group A may be derived are ethylene diisocyanate, 1,6-hexylene diisocyanate, 1,12-dodecylene diisocyanate, 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl diisocyanate, toluene-2,6-diisocyanate, mixtures of toluene-2,4-diisocyanate and toluene-2,6-diisocyanate, 1,4-cyclohexylene diisocyanate, 1,3-phenylene diisocyanate, 1,4-phenylene diisocyanate, 4,4'-dicyclohexylmethane diisocyanate, 3,3'-diphenyl-4,4'-biphenylene diisocyanate, 4,4'-biphenylene diisocyanate, 2,4-diisocyanatodiphenylether, 2,4-dimethyl-1,3-phenylene diisocyanate, 4,4'-diphenylether diisocyanate, isophorone diisocyanate, and the like, and mixtures thereof. In a preferred embodiment, the diisocyanate compound is selected from the group consisting of 4,4'-diphenylmethane diisocyanate, 4,4'-dicyclohexylmethane diisocyanate, 1,6-hexylene diisocyanate, toluene-2,6 diisocyanate, and mixtures thereof. In a more preferred embodiment, the diisocyanate compound is 4,4'-diphenylmethane diisocyanate.

Group B in Formula (1) is a silicone block copolymer having the formula:

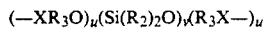

Silicones are organosiloxane (organo oxosilane) polymers consisting of alternating silicon and oxygen atoms with two organic groups attached to the silicon and having the formula $(Si(R_2)_2O)_v$. For example, dimethylsilicone has the formula:

The silicone block copolymers of the present invention are silicones functionally terminated or end capped with organic compounds ($R_3X$—) to yield active hydrogen containing copolymers. For example, dimethylsilicone may be carbinol terminated with ethylene oxide to yield an ethylene oxide-dimethylsilicone-ethylene oxide ABA block copolymer having the following formula:

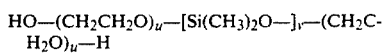

In group B, $R_2$ may be selected from the group consisting of substituted and unsubstituted alkyl groups, cycloalkyl groups, and aryl groups, each $R_2$ group being the same or different and having from 1 to about 18 carbon atoms. Preferably, $R_2$ is selected from the group consisting of alkyl groups and aryl groups, the $R_2$ groups being the same or different and having from 1 to about 6 carbon atoms. More preferably $R_2$ is methyl.

Nonlimiting examples of silicones of type $R_2$ are dimethylsilicones, diethylsilicones, and diphenylsilicones. In a preferred embodiment, the silicone may be selected from the group consisting of dimethylsilicone and diphenylsilicone. In a more preferred embodiment, the silicone is dimethylsilicone.

In group B, $R_3$ is selected from the group consisting of substituted and unsubstituted alkyl groups, cycloalkyl groups, and aryl groups, each $R_3$ group having from 1 to about 18 carbon atoms. Preferably, $R_3$ is selected from the group consisting of alkyl groups and aryl groups, each $R_3$ group having from to about 6 carbon atoms. More preferably, $R_3$ is ethylene.

Nonlimiting examples of organic end capping groups of type $R_3X$—which may be used to functionally terminate the silicone are formaldehyde, ethylene oxide, propylene oxide, butylene oxide, and the like. Preferably, the organic end capping group is selected from the group consisting of ethylene oxide and propylene oxide. More preferably, the organic end capping group is ethylene oxide.

In group B, X may be selected from the group consisting of oxygen and nitrogen. Preferably, X is oxygen.

Examples of functionally terminated polydialkylsilicones useful in the present invention are carbinol terminated ethylene oxide-dimethylsilicone-ethylene oxide ABA block copolymers and aminoalkyl terminated ethylene amine-dimethylsilicone-ethylene amine ABA block copolymers. In a preferred embodiment, the functionally terminated polydialkylsilicone is ethylene oxide-dimethylsilicone-ethylene oxide ABA block copolymer.

In group B, v is an integer ranging from about 5 to about 50, preferably from about 15 to about 30, and more preferably from about 18 to about 22. Preferably, u in group B is an integer ranging from about 5 to about 15, more preferably from about 8 to about 12, and most preferably from about 9 to about 11.

Group D in Formula (1) is a chain extender having the formula:

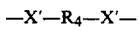

In group D, $R_4$ is selected from the group consisting of substituted and unsubstituted alkyl groups, cycloalkyl groups, and aryl groups, having from to about 12 carbon atoms. Preferably, $R_4$ is an alkyl group having from 1 to about 6 carbon atoms, more preferably, from 1 to 4 carbon atoms.

In group D, X' may be selected from the group consisting of oxygen and nitrogen. Preferably, X' is oxygen.

The chain extenders of the present invention are derived from the corresponding diols, diamines, and amine alcohols (HX'—$R_4$—X'H). Preferably, the chain extender is derived from the group of diols consisting of ethylene glycol, propylene glycol, 1,4-butanediol, 1,6-pentanediol, 1,6-hexanediol, 1,6-heptanediol, and 1,8-octanediol. Alternatively, the chain extender may be derived from the group of diamines consisting of 1,2-diamino ethane, 1,3-diamino propane, 1,2-diamino propane, 1,4-diamino butane, 1,3-diamino butane, 1,6-diamino hexane, 1,2-diamino cyclohexane, 1,4-diamino cyclohexane, 4,4'-diaminocyclohexyl methane, 1,2-phenylene diamine, 1,3-phenylene diamine, 1,4-phenylene diamine, 4,4'-dianilinomethane, benzidine, m-xylylenediamine, p-xylylenediamine, 1,4-diethylbenzene-beta, beta'-diamine, 1,4-dipropylbenzene-beta, beta'-diamine, and piperazine. The chain extender may also be derived from the group of amine alcohols consisting of ethanolamine, 1-amino-2-propanol, 2-amino-1-propanol, 2-amino-1-butanol, 4-amino-1-butanol, and hydroquinone bis(2-hydroxyethyl)ether. In a preferred embodiment, the chain extender is derived from the group consisting of 1,4-butanediol and 1,6-hexanediol. In a more preferred embodiment, the chain extender is derived from 1,4-butanediol.

Group E in Formula (1) above is a phosphorescent dye compound having the formula:

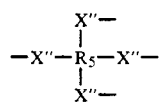

wherein $R_5$ is a porphyrin-type compound chelated with a metal ion, and X" is selected from the group consisting of oxygen and nitrogen, preferably nitrogen.

The term "porphyrin-type compound", as used herein, refers to porphyrin and the family of compounds which contains the basic ring structure of porphyrin but which differs in oxidation state and/or which contains various organic substituent groups. Porphyrin-type compounds are physiologically active nitrogeneous compounds which occur widely in nature. Porphyrin-type compounds have a cyclic tetrapyrrolic structure in which four pyrrole or pyrrole-type rings are connected through their alpha-carbon atoms by four methene (—CH=) or methylene (—CH$_2$—) bridges. In general, the phosphorescent porphyrin-type compounds of the present invention may exist in a variety of oxidation states and may be unsubstituted or substituted with organic groups such as alkyl groups, cycloalkyl groups, carboxyl groups, and aryl groups providing that the phosphorescent porphyrin-type compounds have an absorption spectrum in the region of 400–800 nm.

Nonlimiting examples of porphyrin-type compounds of group $R_5$ which contain the basic ring structure of porphyrin but which differ in oxidation state are chlorin, phorbin, bacteriochlorin, and porphyrinogen. Nonlimiting examples of porphyrin-type compounds of group $R_5$ which contain various organic substituent groups are etioporphyrins, coproporphyrins, uroporphyrins, mesoporphyrins, protoporphyrins, deuteroporphyrins, pyrroporphyrins, and rhodoporphyrins. Other examples of porphyrin-type compounds of group $R_5$ which differ in oxidation state or contain various organic substituent groups, or both, are tetraphenylporphyrins, octaalkylporphyrins, tetrabenzoporphyrins, tetraazaporphyrins, and phthalocyanines. The phosphorescent porphyrin-type compounds of the present invention may exist in optically isomeric forms.

The metal ion chelated to the phosphorescent porphyrin-type compound of group $R_5$ may be any metal ion providing that the phosphorescent porphyrin-type compound has an absorption spectrum in the region of 400–800 nm. Suitable chelating metals for chelating with the phosphorescent porphyrin-type compounds include platinum, palladium, rhodium, and gadolinium. Preferably, the chelating metal is selected from the group consisting of platinum and palladium. More preferably, the chelating metal is platinum.

The phosphorescent porphyrin-type compounds of the present invention are derived from the corresponding active hydrogen containing phosphorescent porphyrin-type compounds [$R_5(X''H)_4$], wherein $X''$ and $R_5$ are as defined above, so that the porphyrin-type compounds may be coupled to the diisocyanate group by condensation and incorporated into the polymeric matrix. The synthesis of phosphorescent porphyrin-type compounds containing functional groups for coupling is well known in the art. In general, phosphorescent porphyrin-type compounds containing functional groups are prepared by a partial or total synthesis of the corresponding porphyrin-type compound employing pyrrole groups containing the desired functional groups in a protected or unprotected form. The structure, synthesis, and electronic absorption spectra of phosphorescent porphyrin-type compounds is described in more detail in, for example, The Porphyrins, David Dolphin, Ed., Academic Press, New York, Volumes 1 and 3 (1978), and The Total Synthesis of Natural Products, John ApSimon, Ed., Wiley-Interscience, New York, Volume 1 (1973), pp. 143–278, which disclosures and the references cited therein are incorporated herein by reference.

In a preferred embodiment, $R_5$ is selected from the group consisting of platinum tetra(p-aminophenyl)-porphine, platinum tetra(p-hydroxyphenyl)porphine, platinum tetra(p-carboxyphenyl)porphine, and mixtures thereof. Most preferably, $R_5$ is platinum tetra(p-aminophenyl)porphine.

The term "alkyl group", as used herein, means substituted and unsubstituted, branched and unbranched, hydrocarbon groups containing from 1 to about 18 carbon atoms. The term "cycloalkyl group", as used herein, means cyclic alkyl groups containing from about 3 to about 6 carbon atoms. The term "aryl group", as used herein, means aromatic groups containing from about 6 to about 14 carbon atoms. Substituents on these groups may be selected from the group consisting of lower-alkyl groups, hydroxy lower-alkyl groups, halogens, and carboxy groups. The term "lower-alkyl group", as used herein, means branched and unbranched hydrocarbon groups containing from 1 to about 7 carbon atoms. The term "halogen", as used herein refers to the chemically related elements consisting of fluorine, chlorine, bromine, and iodine.

The silicone polyurethane copolymers containing phosphorescent dye compounds may also contain conventional additives normally employed in copolymers providing the additives do not interfere with the optical properties of the polymeric composition. Other useful additives include accelerators, catalysts, stabilizers, plasticizers, and the like, which improve or modify the properties of the polyurethane. Examples of such useful additives include polypropylene adipate, organic tins, alkyl and aryl amines, hindered phenols, and fatty amides.

The ratio of the components A, B, D, and E present in the silicone polyurethane copolymers containing phosphorescent dye compounds may be varied to vary the permeability and solubility of oxygen in the polymeric composition. The exact ratio of the components employed is subject to such factors as the type of the components used and the oxygen permeability and solubility desired to decrease photobleaching. The extended useful life resulting from reduced photobleaching is a significant advantage of the copolymers of this invention. Thus, the ratio of components may be varied in order to obtain the result desired in the final product and such variations are within the capabilities of those skilled in the art without the need for undue experimentation. In general, the ratio of the components A:B:D:E in the polymer may vary from about 163.3:161.3:0:1 (liquid-like material, very fast response) to about 163.3:0:161.3:1 (rigid material, slow response), respectively. Preferably, the ratio of the components A:B:D:E will be from about 163.3:5:56.3:1 to about 163.3:80:81.3:1, more preferably, from about 162.3:5:156.3:0.5 to about 165.3:5:15.3:2, and most preferably, about 163.3:32.3:129:1, respectively.

In a preferred embodiment, the silicone polyurethane copolymer containing phosphorescent dye compound is the polymer wherein $R_1$ is 4,4'-diphenylmethane, $R_2$ is methyl, $R_3$ is 1,2-ethylene, $R_4$ is 1,4-butylene, $R_5$ is platinum tetra(p-aminophenyl)porphine, X and X' are oxygen, $X''$ is nitrogen, u is from about 9 to about 11, v is from about 8 to about 22, y and w are from 1 to about 3, z is from about 3 to about 5, and n is from about 7 to about 9.

The present invention extends to methods for making the silicone polyurethane copolymers containing phosphorescent dye compounds. In general, an admixture of the silicone block copolymer, the chain extender, the phosphorescent porphyrin-type compound, and the diisocyanate is formed in a solvent and heated under conditions to promote polymerization. Preferably, an admixture of the silicone block copolymer, the chain extender, and the phosphorescent porphyrin-type compound is first formed in a solvent such as tetrahydrofuran. A solution of the diisocyanate is then added to the admixture with stirring and heated to the reaction temperature. Suitable reaction temperatures range from about 25° C. to about 100° C., preferably from about 40° C. to about 75° C., and more preferably about 65° C. Suitable reaction times range from about 1 hour to about 10 hours, preferably from about 2 hours to about 6 hours, and more preferably about 2.5 hours. When reaction is complete, the solvent may be evaporated or the product may be precipitated by addition of a suitable solvent such as water. The polymer product may then be cast as a film on an optical fiber.

In a specific embodiment, the present invention is directed at a method for preparing a silicone polyurethane copolymer containing a phosphorescent dye compound which comprises the steps of:

(1) providing the following ingredients:

(a) a diisocyanate having the formula:

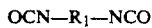

(b) a silicone block copolymer having the formula:

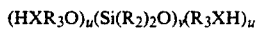

(c) a chain extender having the formula:

(d) a phosphorescent dye compound having the formula:

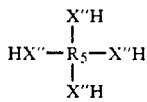

wherein $R_1$, $R_2$, $R_3$, $R_4$, $R_5$, U, v, X, X', and X" have the meanings defined above; and (2) admixing the silicone block copolymer, the chain extender, and the phosphorescent dye compound in a solvent;

(3) reacting the diisocyanate from step (1)(a) with the admixture from step (2) to form the silicone polyurethane copolymer containing a phosphorescent dye compound.

The fiber optic probes incorporating the silicone polyurethane copolymers containing oxygen sensitive phosphorescent dye compounds in accordance with the present invention may be formed by any conventional method such as by extrusion, casting, injection molding, and the like. The probes may be of any desired shape, size, or configuration.

The present invention is further illustrated by the following examples which are not intended to limit the effective scope of the claims. All parts and percentages in the examples and throughout the specification and claims are by weight of the final composition unless otherwise specified.

EXAMPLE

This example illustrates the preparation of a silicone polyurethane copolymer containing a phosphorescent dye compound according to the method of the present invention. The composition of the silicone polyurethane copolymer is set out in Table 1.

TABLE 1

| Components | MW | Millimoles |
| --- | --- | --- |
| platinum tetra-(p-aminophenyl)porphine | 867 | 0.0621 |
| 4,4'-diphenylmethane diisocyanate | 250 | 10.124 |
| ethylene oxide-dimethylsilicone-ethylene oxide ABA block copolymer | 2400 | 2 |
| 1,4-butanediol | 90 | 8 |

A solution of 4.8 g of ethylene oxide-dimethylsilicone-ethylene oxide ABA block copolymer and 0.72 g of 1,4-butanediol in 25 ml of tetrahydrofuran was added to a reaction vessel at room temperature under nitrogen. After the temperature of the reaction mixture was brought 65° C., a solution of 0.0538 g of platinum tetra(p-aminophenyl)porphine in 7.35ml of tetrahydrofuran was added with stirring. After fifteen minutes, a solution of 2.531 g of 4,4'-diphenylmethane diisocyanate in 5 ml of tetrahydrofuran was slowly added. The reaction mixture was then stirred at 65° C. under nitrogen for 1.5 hours. The red reaction mixture was then cooled to room temperature, filtered, and precipitated with water and washed with methanol. The residue was then dried at 60° C. under vacuum to yield an orange fibrous material (7.5g, 94% yield). Films were cast from 30% tetrahydrofuran solution onto optic fibers. The optic fibers were sensitive to oxygen quenching, essentially insensitive to inhalation anesthetics, resistant to photobleaching, and had fast response times.

The embodiments of the present invention described herein are merely exemplary and are not intended to limit the scope of the invention. Many variations and modifications may be made without departing from the spirit and scope of the invention. Applicant intends that all such modifications and variations are to be included within the scope of the invention as defined in the appended claims and their equivalents.

We claim:

1. A silicone polyurethane copolymer containing a phosphorescent dye compound wherein the copolymer is represented by the formula:

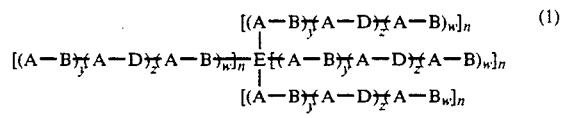

wherein n is an integer ranging from 1 to about 30, and y, z, and w are integers ranging from 0 to about 40, wherein one of y, z, and w is at least one; and (a) A is a diamide group having the formula:

—COHN—$R_1$—NHCO— wherein $R_1$ is selected from the group consisting of substituted and unsubstituted alkyl groups, cycloalkyl groups, and aryl groups, each $R_1$ group containing from 1 to about 30 carbon atoms;

(b) B is a silicone block copolymer having the formula:

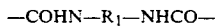

wherein $R_2$ is selected from the group consisting of substituted and unsubstituted alkyl groups, cycloalkyl groups, and aryl groups, each $R_2$ group being the same or different and having from 1 to about 18 carbon atoms; $R_3$ is selected from the group consisting of substituted and unsubstituted alkyl groups, cycloalkyl groups, and aryl groups, each $R_3$ group having from 1 to about 18 carbon atoms; X is selected from the group consisting of oxygen and nitrogen; u is an integer ranging from about 5 to about 15; and v is an integer ranging from about 5 to about 50;

(c) D is a chain extender having the formula:

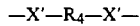

wherein $R_4$ is selected from the group consisting of substituted and unsubstituted alkyl groups, cycloalkyl groups, and aryl groups, each $R_4$ group having from 1 to about 12 carbon atoms; and X' is selected from the group consisting of oxygen and nitrogen; and (d) E is a phosphorescent dye compound having the formula:

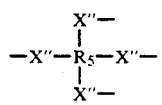

wherein $R_5$ is a phosphorescent compound selected from the group consisting of porphyrin and compounds selected from the group consisting of porphyrin and compounds containing the basic cyclic tetrapyrrolic ring structure of porphyrin which compound has an absorption spectrum in the region of 400–800 nm, said compound being chelated with a metal ion selected from the group consisting of platinum, palladium, rhodium, and gadolinium, and X" is selected from the group consisting of oxygen and nitrogen.

2. The silicone copolymer according to claim 1, wherein y and w are integers ranging rom 0 to about 10, z is an integer ranging from 0 to about 15, and n is an integer ranging from 1 to about 15.

3. The silicone copolymer according to claim 1, wherein $R_1$ is an alkyl or aryl group containing from 1 to about 20 carbon atoms.

4. The silicone copolymer according to claim 1, wherein $R_2$ is selected from the group consisting of alkyl groups and aryl groups, each $R_2$ groups being the same or different and having from 1 to about 6 carbon atoms.

5. The silicone copolymer according to wherein $R_3$ is selected from the group consisting of alkyl groups and aryl groups, each $R_3$ group having from 1 to about 6 carbon atoms.

6. The silicone copolymer according to claim 1, wherein u is an integer ranging from about 8 to about 12 and v is an integer ranging from about 15 to about 30.

7. The silicone copolymer according to wherein $R_4$ is an alkyl group having from 1 to about 6 carbon atoms.

8. The silicone copolymer according to wherein $R_5$ is selected from the group consisting of platinum tetra(p-aminophenyl)porphine, platinum tetra(p-hydroxyphenyl)porphine, platinum tetra(p-carboxyphenyl)porphine, and mixtures thereof.

9. The silicone copolymer according to claim 1, wherein the metal ion in group $R_5$ is selected from the group consisting of platinum and palladium.

10. The silicone copolymer according to claim 1, wherein X and X' are oxygen and X" is nitrogen.

11. The silicone copolymer according to claim 1, wherein $R_1$ is 4,4'-diphenylmethane, $R_2$ is methyl, $R_3$ is 1,2-ethylene, $R_4$ is 1,4-butylene, $R_5$ is platinum tetra(p-aminophenyl)porphine, X and X' are oxygen, X" is nitrogen, u is from about 9 to about 11, v is from about 18 to about 22, y and w are from 1 to about 3, z is from about 3 to about 5, and n is from about 7 to about 9.

12. A method for preparing a silicone polyurethane copolymer containing a phosphorescent dye compound which comprises the steps of:

(1) providing the following ingredients:
(a) a diisocyanate having the formula:

$$OCN-R_1-NCO$$

wherein $R_1$ is selected from the group consisting of substituted and unsubstituted alkyl groups, cycloalkyl groups, and aryl groups, each $R_1$ group containing from 1 to about 30 carbon atoms;

(b) a silicone block copolymer having the formula:

$$(HXR_3O)_u(Si(R_2)_2O)_v(R_3XH)_u$$

wherein $R_2$ is selected from the group consisting of substituted and unsubstituted alkyl groups, cycloalkyl groups, and aryl groups, each $R_2$ group being the same or different and having from 1 to about 18 carbon atoms; $R_3$ is selected from the group consisting of substituted and unsubstituted alkyl groups, cycloalkyl groups, and aryl groups, each $R_3$ groups having from 1 to about 18 carbon atoms; X is selected from the group consisting of oxygen and nitrogen; u is an integer ranging from about 5 to about 15; and v is an integer ranging from about 5 to about 50;

(c) a chain extender having the formula:

$$HX'-R_4-XC'H$$

wherein $R_4$ is selected from the group consisting of substituted and unsubstituted alkyl groups, cycloalkyl groups, and aryl groups, each $R_4$ group having from 1 to about 12 carbon atoms; and X' is selected from the group consisting of oxygen and nitrogen; and (d) a phosphorescent dye compound having the formula:

$$\begin{array}{c} X''H \\ | \\ HX''-R_5-X''H \\ | \\ X''H \end{array}$$

wherein $R_5$ is a phosphorescent compound selected from the group consisting of prophyrin and compounds containing the basic cyclic tetrapyrrolic ring structure of prophyrin which compound has an absorption spectrum, in the region of 400–800 nm, said compound being chelated with a metal ion selected from the group consisting of platinum, palladium, rhodium, and gadolinium, and X" is selected from the group consisting of oxygen and nitrogen; and (2) admixing the silicone block copolymer, the chain extender, and the phosphorescent dye compound in a solvent;

(3) reacting the diisocyanate from step (1)(a) with the admixture from step (2) to form the silicone polyurethane copolymer containing a phosphorescent dye compound.

* * * * *

UNITED STATES PATENT AND TRADEMARK OFFICE
CERTIFICATE OF CORRECTION

PATENT NO. :  5,155,149
DATED      :  Oct. 13, 1992
INVENTOR(S) :  Atwater et al It is certified that error appears in the above—identified patent and that said Letters Patent is hereby corrected as shown below:

Col. 11, Claim 7, line 28, after "according to", insert -- claim 1.

Col. 11, Claim 8, line 30, after "according to", insert -- claim 1.

Signed and Sealed this

Twenty-eighth Day of September, 1993

*Attest:*

BRUCE LEHMAN

*Attesting Officer*    *Commissioner of Patents and Trademarks*